Nov. 21, 1967     L. E. WOLINSKI     3,353,988
GRAFT POLYMERIZATION ON POLYMERIC SUBSTRATES
Filed May 20, 1964
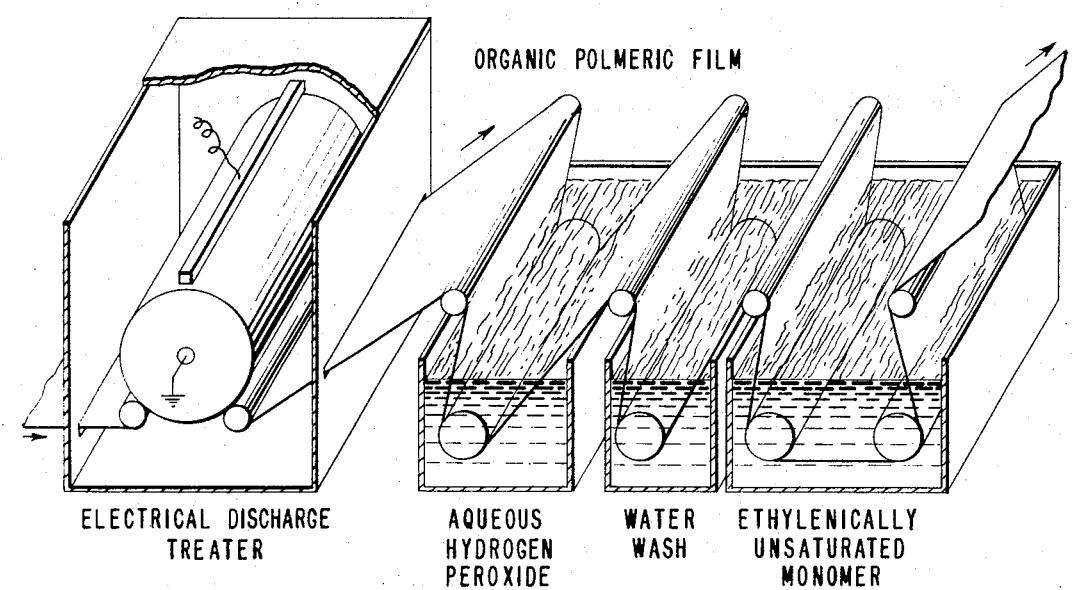
INVENTOR
LEON EDWARD WOLINSKI
BY
ATTORNEY

United States Patent Office 3,353,988
Patented Nov. 21, 1967

3,353,988
GRAFT POLYMERIZATION ON POLYMERIC SUBSTRATES
Leon Edward Wolinski, Buffalo, N.Y., assignor to E. I. du Pont de Nemours and Company, Wilmington, Del., a corporation of Delaware
Filed May 20, 1964, Ser. No. 368,892
4 Claims. (Cl. 117—47)

ABSTRACT OF THE DISCLOSURE

The surface of an organic polymer shaped structure, e.g., polyethylene film, is subjected, under normal atmospheric conditions, to the action of an electrical discharge having an average energy level below 15 electron volts; the resulting treated structure is passed through a bath containing an agent providing a source of free radicals, e.g., an aqueous solution of hydrogen peroxide; and immediately thereafter the surface of the structure is contacted, e.g., coated, with an ethylenically unsaturated monomer which polymerizes in situ to form a polymer chemically bonded to the organic polymer structure.

---

It is known to produce graft polymers on organic polymer substrates which have been subjected to the action of high energy ionizing radiation. The exposure of organic polymers to high energy radiation, however, frequently involves many side effects including cross linking and degradation which, in turn, alter the physical properties of the irradiated polymer.

It is also known to effect graft polymerization on organic polymer substrates by subjecting such a substrate in the substantial absence of oxygen to relatively low energy ionizing radiation. While such treatments avoid the adverse actions of the high energy irradiation on such substrates, the process tends to be slow by present day commercial standards, and provisions have to be made for the elimination or avoidance of an atmosphere of oxygen.

It is therefore an object of this invention to provide an economically feasible process, free of degradative side effects, for graft polymerization of polymerizable monomers onto polymeric films. The foregoing and related ends will more clearly appear from the detailed description which follows.

The objects are realized by the process of the present invention which, briefly stated, comprises in combination the sequential steps of (1) subjecting an organic polymeric shaped structure, e.g., organic polymeric film, to the action of an electrical discharge at substantially atmospheric pressure between spaced electrodes maintained at a voltage differential in excess of about 1000 volts said electrical discharge having an average energy level below 15 electron volts; (2) contacting the surface of the resulting polymeric shaped structure with an agent capable of providing a source of free radicals; and (3) substantially immediately thereafter contacting the surface of the polymeric shaped structure with an ethylenically unsaturated monomer whereby to form on said surface a polymeric coating.

Because of the commercial importance of organic polymeric films this invention will be hereinafter described with specific reference to such shaped structures as the substrate material. It will be apparent, however, that the principles of this invention are applicable to all organic polymeric shaped structures including in addition to film, filaments, woven and non-woven fabrics, ribbons, rods, tubes, etc.

In a preferred embodiment of this invention, illustrated diagrammatically in the accompanying drawing, a thermoplastic organic polymeric film is continuously passed between a set of spaced electrodes consisting of a rotating metal roll which is connected electrically to ground and one or more stationary electrodes disposed parallel to the longitudinal axis of the roll and spaced a distance of from 0.03 to 0.125 of an inch from the surface thereof. The electrodes are each connected to a suitable power source which supplies an alternating current of from 0.3 to 5.5 RMS (root mean square) amperes at a voltage in the range of 10,000 to 30,000 volts with pulsating peak voltages up to 100,000 volts and at a frequency of at least 350 cycles per second and preferably in the range of 300,000 to 500,000 cycles per second. The film is then continuously passed thru a bath consisting of an aqueous solution of 30% hydrogen peroxide, which provides a source of free radicals thence through a water wash bath to remove excess hydrogen peroxide from the surface of the film, and finally is drawn thru a bath of ethylenically unsaturated polymerizable monomer which polymerizes in situ to form on the surface of the film exposed to the electrical discharge a polymeric coating which is chemically bonded to the substrate.

As indicated above the preferred agent capable of providing free radicals is hydrogen peroxide. In addition to hydrogen peroxide agents such as benzoyl peroxide, N-nitrosoacylanilides, para-bromobenzenediazo hydroxide, triphenylmethylazo benzene, azobisisobutyronitrile and tetraphenylsuccinonitrile are typical of other agents which may be employed with like effect. It is generally preferred to wash excess agent from the surface of the film after treatment. However, grafting, i.e. chemical bonding, of the polymer coating to the substrate is affected also when the washing step is omitted but the yield of grafted polymer may be lower.

The process of this invention is effective to provide an adherent coating of polymeric material on any substrate of organic polymer of the thermoplastic or thermosetting type. Among the polymeric substrates, e.g., films, which may be submitted to the grafting techniques described in this invention are the hydrocarbon polymers such as polyethylene, polystyrene, polybutadiene, rubber, polyisobutylene, butadiene/styrene copolymers and the like; halogenated hydrocarbon polymers such as polyvinyl chloride, polyvinylidene chloride, polychlorene, polytetrafluoroethylene, polyvinyl fluoride, chlorinated and chlorosulfonated polyethylene and the like; ester-containing polymers such as polyvinyl acetate, polymethyl methacrylate, polyethylene terephthalate and the like; hydroxyl containing polymers such as polyvinyl alcohol, cellulose, regenerated cellulose and the like; ether containing polymers such as polyethylene oxide, polymeric formaldehyde, solid polyethylene tetrahydrofurane, dioxalene polymers and the like, condensation polymers such as the polyamides, polyimides, phenyl/formaldehyde polymers, urea/formaldehyde polymers, triazine/formaldehyde polymers and the like, polypeptides, silicones, and olefin polysulfones.

As examples of ethylenically unsaturated monomers which can be grafted onto the various polymeric substrates, may be mentioned alkyl acrylates and methacrylates such as methyl methacrylate, ethyl acrylate, etc., acrylic and methacrylic acid, ethylene and its derivatives such as the halosulfonated ethylenes and tetrafluoroethylene, vinyl chloride, vinyl acetate, vinylidene chloride, styrene, acrylonitrile, methacrylonitrile, butadiene and isoprene.

In some cases, in order to realize more efficient grafting, it may be desirable to protect the film after the steps of activation in the electrical discharge and exposure to the free radical source with an inert blanketing atmosphere such as steam, carbon dioxide or nitrogen.

Any suitable means known to the art for providing an electrical stress field (i.e., an electrostatic field) of alternating or pulsating character between spaced electrodes (e.g. a high frequency spark generator of the type hereinafter identified or a motor generator setup) may be employed as the power source in the electrical discharge treatment of this invention. Such source should provide a potential at the electrode which is within the range varying from very low voltages in the order of about 1000 volts up to pulsating peak of 100,000 volts and above.

inch to as much as 0.25 inch provided suitable adjustments in such features as amount of current, electrode dimension and exposure time are made.

The following specific examples will serve to further illustrate the principles and practice of this invention.

In each of the examples tabulated below a film of the character specified was drawn through the electrical discharge apparatus of the type illustrated in the accompanying drawing at a rate of 10 feet per minute. The electrodes of the apparatus were connected to a Lepel High Frequency Spark Generator Model HFSG (Lepel High Frequency Laboratory). The setting on the unit was 55 for each electrode. The film after treating in the electrical discharge was then drawn through an aqueous solution of 30% hydrogen peroxide containing a small amount of sodium oleate as a wetting agent. The film was thereafter drawn through a wash tank to remove excess hydrogen peroxide from the film surface and the resulting washed film was then drawn through a solution of the specified ethylenically unsaturated monomer. The resulting coated film was then subjected to a number of tests designed to detect differences in the characteristics of the film over that of the untreated film. Such differences or improvements are recorded under the heading "Remarks" in Table I below.

TABLE I

| Example | Polymeric Film | Monomer | Remarks |
|---|---|---|---|
| 1 | Branched polyethylene | Vinylidene chloride | Layer of coating formed on surface. Coating layer essentially unaffected by extraction with methyl ethyl ketone. Coated film had lower moisture permeability than nontreated film. |
| 2 | Linear polyethylene | Styrene | Glossy layer formed on surface. Treated film had increased electrical surface resistance. Extraction with chloroform did not remove coating. |
| 3 | Biaxially oriented polypropylene. | Vinylidene chloride | Treated film had layer of coating and showed decreased oxygen permeability. Coating not removed on extraction of the film with methyl ethyl ketone. |
| 4 | Biaxially oriented polyethylene terephthalate. | Methyl methacrylate | Coating formed on surface. Coated film showed better surface slip than nontreated film. Coating was not removed by extraction with acetone. |
| 5 | Biaxially oriented linear polyethylene. | Vinyl chloride/vinylidene chloride mixture. | Treated film showed strong adhesion to polyamide topcoating. Topcoating could not be peeled from base layer without tearing of base. Topcoat stripped easily from nontreated control film. |
| 6 | Polyhexamethylene adipamide. | Vinyl acetate | Treated product could be readily heat sealed, nontreated control could not be heat sealed at normal sealing temperatures. |

Frequencies from 350 cycles per second up to 500,000 cycles per second or higher can be used and frequencies in the range of 300,000 to 500,000 cycles are preferred for rapid and effective treatment.

In general, the effectiveness of the treatment increases with amount of current to the electrodes for a given area of electrode and time of exposure. Current to the electrodes may range up to 5.5 RMS (root mean square) amperes or higher. However, it is preferred to operate in the range of 0.3 RMS amperes to 3.5 RMS amperes to give reasonable treating times on the one hand, and to avoid rapid degradation of the electrodes at too high currents on the other hand. Power to the high frequency generator may range from 10 watts per lineal inch of the electrode length to 1800 watts per lineal inch of the electrode length. The electrical discharge employed herein, operating within the parameters above specified, has an average energy level below 15 electron volts, and is not to be confused with the high or intermediate energy irradiations heretofore used to treat polymeric surfaces.

Time of exposure to the electric discharge treatment is not especially critical and effective treatments are realized at exposure times as low as one second or less and no adverse effects are noted at times as long as 60 seconds. Longer exposure times can probably also be employed although for economic reasons exposure times as short as possible, consistent with effective treatment would normally be employed.

Preferably, the electrodes are spaced from about .03 inch to about 0.125 inch apart. However, useful results can be obtained when the electrodes gap is as low as .015

It will be evident from the foregoing description and examples that the process of this invention provides a simple and economic expedient for providing an organic polymeric substrate, and particularly organic polymeric, self-supporting film structures with a polymeric continuous coating selected to enhance the properties and utility of the substrate.

I claim:

1. A process which comprises, in combination, the sequential steps of (1) subjecting an organic polymeric shaped structure to the action of an electrical discharge in air at substantially atmospheric pressure between spaced electrodes maintained at a voltage differential in excess of about 1000 volts, said electrical discharge having an average energy level below 15 electron volts; (2) contacting the surface of the resulting polymeric shaped structure with an agent capable of providing a source of free radicals; and (3) substantially immediately thereafter contacting the surface of the polymeric shaped structure with an ethylenically unsaturated monomer whereby to form on said surface an adherent polymeric coating.

2. The process of claim 1 wherein said agent is an aqueous solution of hydrogen peroxide.

3. The process of claim 1 wherein said shaped structure is a self-supporting film.

4. A process which comprises, in combination, the sequential steps of (1) passing, at substantially atmospheric pressure, a continuous thermoplastic organic polymeric film continuously between a set of spaced electrodes consisting of a rotating metal roll connected electrically to ground over which the film passes, and at least one elongated stationary electrode aligned with its longitudinal axis parallel to the longitudinal axis of the roll and spaced a distance of from 0.015 to 0.25 of an inch from the surface thereof, while continuously applying to said stationary electrode an alternating current at a voltage within the range of from 1000 to 100,000 volts, and at a frequency in the range of 350 to 500,000 cycles per second, to create an electrical discharge in air between said electrodes having an average energy level below 15 electron volts; (2) then continuously passing said film thru a bath consisting essentially of an aqueous solution of hydrogen peroxide; and (3) continuously passing said film thru a bath of ethylenically unsaturated monomer whereby to form on the surface of the film subjected to the action of said electrical discharge an adherent polymeric coating.

References Cited
UNITED STATES PATENTS

| | | | |
|---|---|---|---|
| 2,802,085 | 8/1957 | Rothacker | 117—47 |
| 2,907,675 | 10/1959 | Gaylord | 117—47 |
| 2,935,418 | 5/1960 | Berthold et al. | 117—47 |
| 2,955,953 | 10/1960 | Graham | 117—47 |
| 3,111,424 | 11/1963 | Le Clair | 117—47 |

MURRAY KATZ, *Primary Examiner.*